United States Patent
Lou et al.

(10) Patent No.: US 8,027,933 B2
(45) Date of Patent: Sep. 27, 2011

(54) POSTAL PACKAGE DELIVERY SYSTEM

(75) Inventors: Zhe Lou, Antwerp (BE); Bert Bruynooghe, Gentbrugge (BE); Sigurd Van Broeck, Zoersel (BE); Jan Lode Mia Moons, Heist-op-den-Berg (BE)

(73) Assignee: Alcatel Lucent, Paris (FR)

( * ) Notice: Subject to any disclaimer, the term of this patent is extended or adjusted under 35 U.S.C. 154(b) by 144 days.

(21) Appl. No.: 12/332,471

(22) Filed: Dec. 11, 2008

(65) Prior Publication Data

US 2009/0157420 A1 Jun. 18, 2009

(30) Foreign Application Priority Data

Dec. 12, 2007 (EP) ...................................... 07291505

(51) Int. Cl.
*G06Q 30/00* (2006.01)
(52) U.S. Cl. ........................................ 705/336; 705/338
(58) Field of Classification Search .................. 705/336, 705/338
See application file for complete search history.

(56) References Cited

U.S. PATENT DOCUMENTS

| | | | | |
|---|---|---|---|---|
| 7,427,024 | B1 * | 9/2008 | Gazdzinski et al. | 235/384 |
| 2002/0165729 | A1 * | 11/2002 | Kuebert et al. | 705/1 |
| 2004/0030604 | A1 * | 2/2004 | Young | 705/26 |
| 2004/0093312 | A1 * | 5/2004 | Cordery et al. | 705/401 |
| 2004/0176872 | A1 | 9/2004 | Eidemiller | |
| 2005/0004877 | A1 * | 1/2005 | McLellan et al. | 705/400 |
| 2005/0006469 | A1 * | 1/2005 | Nonneman et al. | 235/384 |
| 2005/0203854 | A1 * | 9/2005 | Das et al. | 705/64 |
| 2006/0047610 | A1 * | 3/2006 | Parkos et al. | 705/410 |
| 2006/0238334 | A1 * | 10/2006 | Mangan et al. | 340/539.13 |
| 2007/0000989 | A1 | 1/2007 | Kadaba | |

FOREIGN PATENT DOCUMENTS

WO  WO 00/16278  3/2000

OTHER PUBLICATIONS

"Make Your Warehouse Deliver", Transportation & Distribution 1997 Buyers Guide Issue Supplement, pp. BG18-BG20, Jul. 1997.*
European Search Report.

* cited by examiner

*Primary Examiner* — John Hayes
*Assistant Examiner* — Kevin Flynn
(74) *Attorney, Agent, or Firm* — Fay Sharpe LLP

(57) ABSTRACT

The present invention relates to a Postal package delivery system for forwarding a packet from a sender towards a destination through a postal network where the postal network comprises a plurality of postal nodes for sorting and forwarding the package through said network via at least one node of said plurality of postal nodes towards the destination. The forwarding of the package is based on the address of said destination, where a tag associating device is able to associate a tag of the package flexibly with a physical address of a plurality of addresses of said destination.

7 Claims, 2 Drawing Sheets

POSTAL PACKAGE DELIVERY SYSTEM

The present invention relates to a Postal package delivery system according to the preamble of claim 1.

Such a Postal package delivery system is already known in the art, e.g. from "International Patent Application with reference WO0016278. Therein, a Postal package delivery system disclosed, where the Postal package delivery system is adapted to forward a packet from an origin towards a destination through a postal network that comprises a plurality of postal nodes each for sorting and forwarding the package through the network via at least one postal node of said plurality of postal nodes towards the destination. The forwarding of such a package is based on the address of the destination while the address of the destination is stored in an RFID circuit, called a tag, The RFID circuit is attached to said package. The destination address initially is to be entered manually via a computer system that in turn stores the information in an RFID circuit forming part of a RFID stamp. The forwarding of the package in each of the nodes is automatically dealt with by first reading the ZIP stored in the RFID stamp, being attached to the package and subsequently basing a forwarding decision on the ZIP-code, read from the RFID stamp. Each node autonomously makes a forwarding decision based on fixed and predetermined address information (ZIP-Code) stored in the RFID circuit.

In this system a destination address including a ZIP-code is manually entered to the stamp and used till delivery at the physical destination address as stored in the RFID stamp attached to the package.

An object of the present invention is to provide a Postal package delivery system of the above known type but wherein the addressing determination of the destined person is more flexible.

According to the invention, this object is achieved by the postal package delivery system as described in claim 1, the related devices according to claim 6 and 7.

Indeed, due to the tag associating device that is adapted to associate the tag of the package flexibly with a physical address of a plurality of addresses of said destination a destination address can be associated where destination, i.e. resides at moment of delivery of packet. The destination for instance may be a person. This person may have a plurality of addresses where he or she may be reachable. The destination address of the destined person for instance may be the home address, the business address or even a holiday's address or another address.

Another characteristic feature of the present invention is defined in claim 2.

The additional central tag resolution device that is adapted to resolve the physical destination address of the destination, that is associated with the tag of the package at request of a postal node of said plurality of postal nodes so that the postal node can decide how to best forward the package based on the associated destination address. The destination address of the destined person for instance may be the home address, the business address or even a holiday's address or another address of the destination.

Another characteristic feature of the present invention is defined in claim 3.

The Postal package delivery system additionally comprises tracking means that is adapted to keep track of the location of said package at reaching a postal node and further is able by means of the notification means to notify the sender or destination of the location of said package within the postal network.

Another characteristic feature of the present invention is defined in claim 4.

The tag associating device TAG-ASSO of the postal package delivery system additionally is adapted to resolve the physical destination address from a user profile holding part UP based on the phone number associated with the destination. Hence, the tag associating device TAG determines a physical destination address from a device holding user profiles UP and based on the user profile identified by the telephone number the associated destination address can be found.

A further characteristic feature of the present invention is defined in claim 5.

The tag associating device TAG-ASSO in a further embodiment is additionally adapted to retrieve the tag associated with the package together with a telephone number associated with said destination of said package, from a mobile user device that is adapted to read the tag, the mobile user device in turn being identified by a second telephone number of said mobile user device.

The sender may read the tag that is associated with the package and send this tag read together with a phone number of the destination and optionally the second telephone number being the phone number identifying the user mobile device towards the tag associating device TAG-ASSO.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
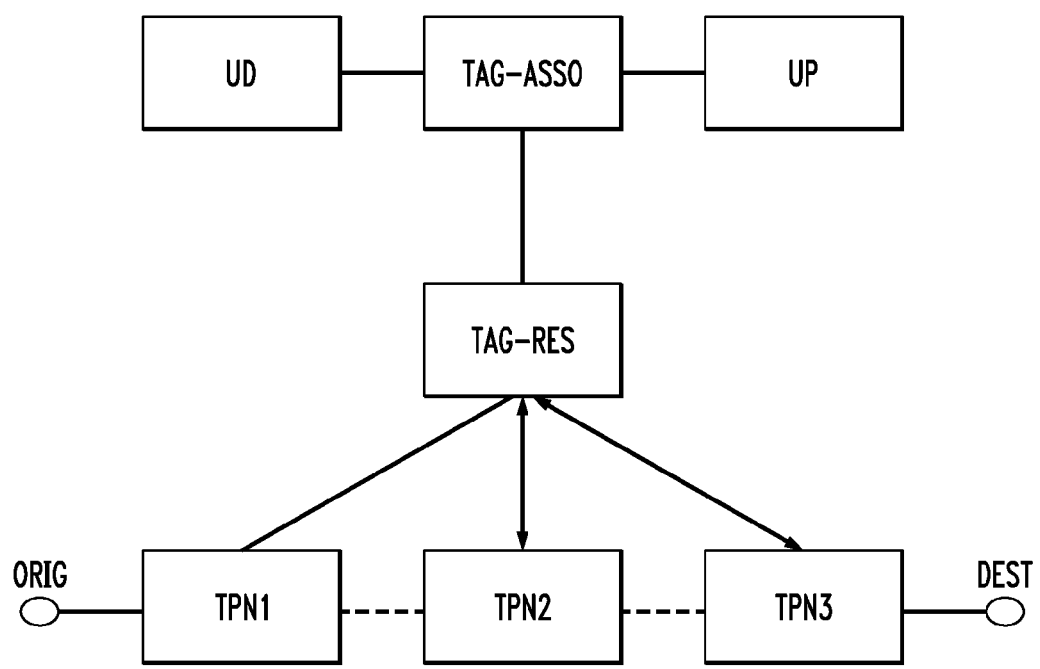
FIG. 1 represents a postal package delivery system according to the present invention.
Figure 2:
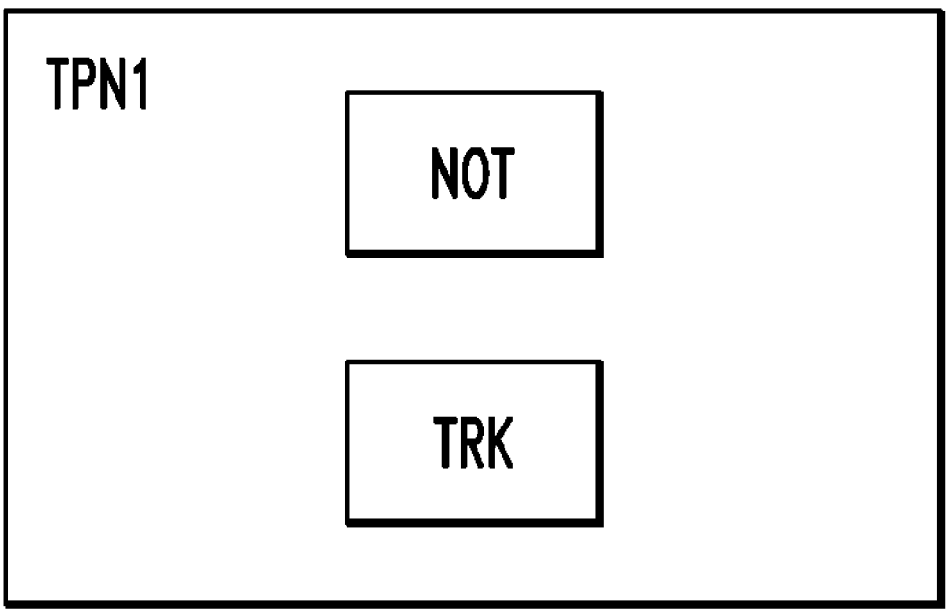
FIG. 2 represents a more detailed view of an illustrative postal node of the postal package delivery system of FIG. 1.

In the following paragraphs, referring to the drawing, a postal package delivery system will be described wherein an implementation of the method according to the present invention is executed.

In the first paragraph the elements of the network in the figure are described, in the second paragraph, the interconnections between all before described Network elements are defined and in a later paragraph the actual execution of the an postal package delivery system and related method will be described.

First the postal package delivery system of the present invention comprises a postal network containing a plurality of postal nodes TPN1, TPN2, TPN3, for instance being the post office where the package is delivered by the sender, a point where post is sorted and forwarded and a last office taking care of the actual delivery at the destination. The postal package delivery system further comprises a tag associating device TAG-ASSO that is adapted to associate said tag of said package flexibly with said a physical address of a plurality of addresses of said destination and a central tag resolution device TAG-RES that is adapted to resolve the destination address associated with the tag of the package at request of a postal node of the plurality of postal nodes TPN1, TPN2, TPN3.

The tag associating device TAG-ASSO, further is adapted to resolve said physical destination address from a user profile holding part UP based on a phone number associated with said destination.

Furthermore the tag associating device TAG-ASSO is adapted to retrieve said tag of said package together with a telephone number associated with the destination of the package from a mobile user device adapted to read the tag and being identified by a second telephone number of said mobile user device.

A further element of the postal package delivery system is a central tag resolution device TAG-RES that is adapted to resolve the destination address associated with said tag of said package at request of a postal node of said plurality of postal nodes TPN1, TPN2, TPN3.

The postal package delivery system additionally comprises a user profile holding part for instance residing a user profile holding server as a separate network element or included in the tag associating device TAG-ASSO The user profile holding part is adapted to maintain a plurality of associations, each association at least containing a tag and a corresponding physical destination address of a destination being a user of the system. The user may change the address based on a current location of the user like in holiday's period using the holidays address.

A further component of the postal package delivery system may be a mobile user device being able to read tags. In case such a tag is a RFID tag the mobile user device comprises a RFID enabled tag reader. The mobile user device may be a mobile phone or a Personal digital assistant PDA alike device having certain communication facilities like short message service or email-capabilities or possibly short-range communication means such as WIFI or Bluetooth or wireless USB, or possibly long-range communication means such as 2G or 3G.

Finally there is a tag such as a RFID tag at least containing a unique reference number.

The mobile user device is coupled with the tag associating device TAG-ASSO over a communication connection such as a mobile communication connection GSM, WIFI Bluetooth or wireless USB.

The mobile user device additionally is equipped with a near field communications means for reading the associated tag such as a RFID tag.

This user device also may be a fixed communications device having similar function modules like the tag reader.

The tag associating device TAG-ASSO is coupled to the user profile holding part UP based over a communication connection such as web services or may even be integrated in the tag associating device TAG-ASSO.

The tag associating device TAG-ASSO and the central tag resolution device TAG-RES are coupled over a web service. Alternatively both devices may be integrated in one housing.

The central tag resolution device TAG-RES is coupled to any of the Postal nodes TPN1, TPN2, TPN3 over a web service.

In order to explain the present invention it is assumed that a user A brings a package to the post office for delivering the package to a destination, being user B. At first a tag such as an RFID tag is attached to the package to be delivered. The sender, user A for instance selects the destination of the package in from the list of contacts in its mobile phone. User B is selected as destination. Additionally user A reads the tag, i.e. the RFID tag and determines the reference number from the tag. Then the sender, user A, sends the tag just read, i.e. the RFID, the information on the selected destination, User B, with its unique (mobile) phone number (mobile ID) and the (mobile) telephone number of the sender telephone in a message towards the tag associating device TAG-ASSO that receives the message including the tag of the package, the telephone number of the destination and the telephone number of the sender.

The sender information as well as the destination information may additionally contain email addresses of respectively the sender and the destination.

The tag associating device TAG-ASSO will then resolve the received destination information into a detailed coordinates of both the sender and the receiver with the aid of the User Profile holding part UP. The User Profile holding part UP contains a list of records with the unique telephone numbers including mobile phone numbers as an identifier where each such telephone number is linked to an address of the owner of the telephone number. The association of telephone number and address may comprise additional personal information such as an email address, an Instant Messenger ID. Hence the User Profile holding part UP may contain a plurality of records, each record including a unique telephone number, address information an email address etc. . . .

Here the physical addresses of the sender and the destination not necessarily needs to be their home address. In case the destination, user B, is on vacation outside the country, their "mobile" addresses will be resolved into the system and results in the holiday address. Hence, the package can be sent to a person instead of to an address. Afterwards, the tag associating device TAG-ASSO sends the tag, i.e. the RFID and detailed coordinates to the central tag resolution device TAG-RES. The central tag resolution device TAG-RES then is able to resolve the physical destination address associated with said tag (i.e. the holidays address) of said package at request of a postal node TPN1. The postal node TPN1 then is able to forward the package based on the resolved destination address being the holiday's address of user B. As a consequence of the previous the package is forwarded to postal node TPN 2, which is a step closer to the destination for instance a postal center for international post.

Optionally a notification means of the receiving postal node TPN1 will send a message back User B (the message could be an SMS/email/instant message to the handheld/PC/mobile handheld of User B) saying "User A is going to send you a parcel" based on personal settings. This notification also could be performed by the tag associating device TAG-ASSO or the central tag resolution device TAG-RES.

This node also resolves based on the Tag, i.e. the RFID the destination and as based hereon takes the next forwarding decision, which is forwarding the package to postal node TPN3 being the post office in the city where user B resides during his holidays. The package arrives at the hand of a distributor. Right before the distributor deliveries the parcel to the destination; he touches the tag, i.e. the RFID with his RFID enabled handheld. The handheld sends the RFID and mobile ID to the tag associating device TAG-ASSO. The tag associating device TAG-ASSO, recognizes the mobile ID is from a distributor and sends the RFID and an information <letting is arriving> to the postal node TPN3. Afterwards, the postal node TPN3 will first resolve the RFID into the phone number/email of User B, then sends a message to User B, e.g. "your parcel is going to arrive in an hour, please stay at home".

When User B receives the parcel, he touches the tag i.e. the RFID with his RFID enabled handheld. It could be considered as putting his signature on the receipt of the parcel. The handheld of User B sends the tag i.e. the RFID and its mobile ID to the central tag resolution device TAG-RES which will resolve the tag, i.e. the RFID into an address of the destination and based heron, notify the sender via SMS/email after detecting the received mobile ID from the tag associating device TAG-ASSO is identical to the mobile number of User B.

It is to be remarked that the tracking by means of the tracking means, can be dealt with in the postal nodes at receipt of a packet or alternatively in the central tag resolution device based on an incoming request for resolution of a tag, the tracking means my for instance be included in a postal node or in the central tag resolution device or even in another device in the system.

The same is valid for the notification means that may be located, independently from the location of the tracking means be in any device of the system. The notification then at least is based on tracking information determined by the tracking means.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A postal package delivery system for forwarding a package from a sender towards a destination through a postal network, said postal network comprising a plurality of postal nodes (TPN1, TPN2, TPN3) for sorting and forwarding said package through said network via at least one node of said plurality of postal nodes (TPN1, TPN2, TPN3) towards said destination, said forwarding being based on an address of said destination, wherein said package delivery system additionally comprises:
    a. a tag associating device (TAG-ASSO), adapted to associate information of a tag of said package flexibly with a physical address of a plurality of addresses of said destination,
    wherein said tag associating device (TAG-ASSO) is adapted to retrieve said information of said tag of said package together with a telephone number associated with said destination of said package, said information of said tag and said telephone number associated with said destination being received from a sender's mobile user device that is adapted to read said tag to acquire said information of said tag, and is further adapted to transmit read and acquired tag information to said tag associating device (TAG-ASSO).

2. The postal package delivery system according to claim 1, wherein said postal package delivery system additionally comprises:
    b. a central tag resolution device (TAG-RES), adapted to resolve said address of said destination associated with said information of said tag of said package at request of a postal node of said plurality of postal nodes (TPN1, TPN2, TPN3).

3. The postal package delivery system according to claim 1, wherein said system additionally comprises:
    c. tracking means (TRK), adapted to keep track of the location of said package at reaching a postal node;
    d. notification means (NOT), adapted to notify said sender or destination of said location of said package within the postal network.

4. The postal package delivery system according to claim 1 wherein said tag associating device (TAG-ASSO), further is adapted to resolve said physical destination address from a user profile holding part (UP) based on a phone number associated with said destination.

5. The system according to claim 1, wherein said tag associating device (TAG-ASSO) being adapted to associate said information of said tag of said package flexibly with said a physical address of a plurality of addresses of said destination.

6. The system according to claim 2, wherein said central tag resolution device (TAG-RES) being, adapted to resolve the destination address associated with said information of said tag of said package at request of a postal node of said plurality of postal nodes (TPN1, TPN2, TPN3).

7. The postal package delivery system according to claim 1, wherein said received telephone number associated with said destination is received via a sender selection of a destination on said sender's mobile user device.

* * * * *